Figure 2:
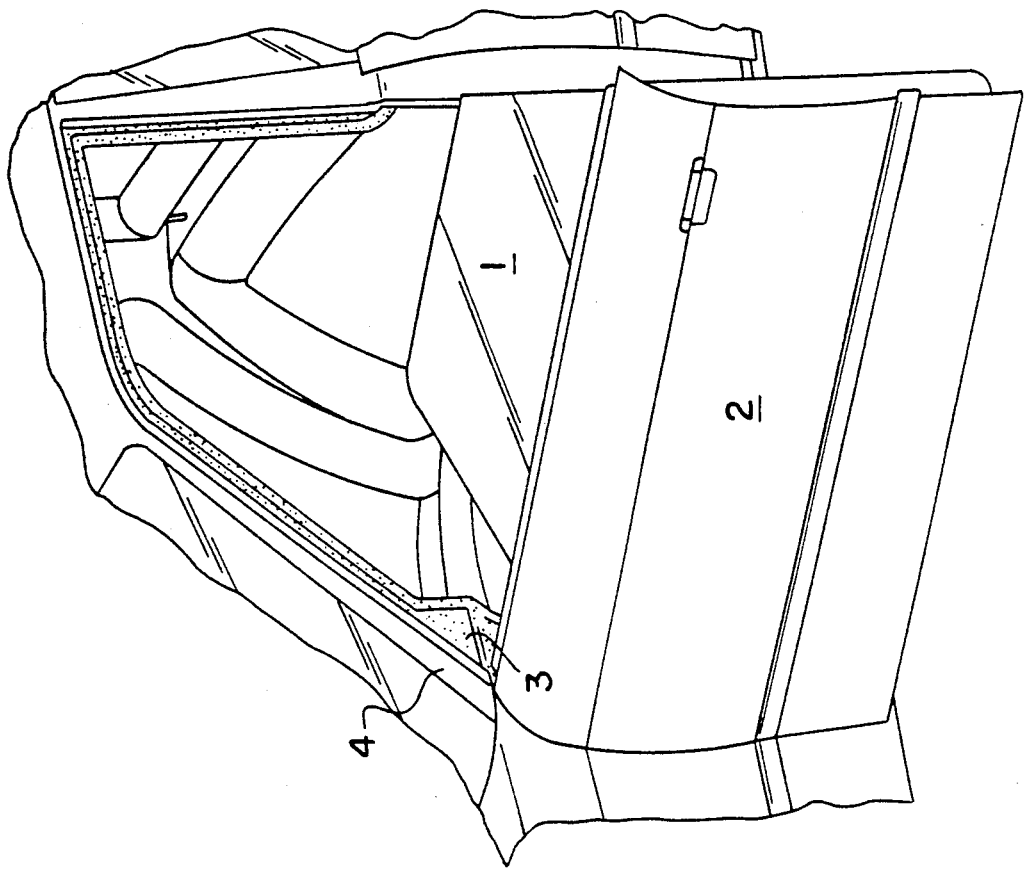

United States Patent [19]

Scholtyssek et al.

[11] Patent Number: 5,080,424
[45] Date of Patent: Jan. 14, 1992

[54] DOOR COVER AND SEAL FOR A DOOR

[75] Inventors: Siegbert Scholtyssek; Manfred Uebelstaedt, both of Wettstetten, Fed. Rep. of Germany

[73] Assignee: Audi AG, Ingolstadt, Fed. Rep. of Germany

[21] Appl. No.: 466,394

[22] PCT Filed: Sep. 27, 1988

[86] PCT No.: PCT/EP88/00867
§ 371 Date: Apr. 25, 1990
§ 102(e) Date: Apr. 25, 1990

[87] PCT Pub. No.: WO89/04777
PCT Pub. Date: Jun. 1, 1989

[30] Foreign Application Priority Data

Nov. 20, 1987 [DE] Fed. Rep. of Germany ....... 3739355

[51] Int. Cl.$^5$ .............................................. B60J 1/17
[52] U.S. Cl. ................................ 296/146; 296/202
[58] Field of Search ................. 296/146, 202, 203; 49/502

[56] References Cited

U.S. PATENT DOCUMENTS

| 2,997,336 | 8/1961 | Huggins et al. | 296/146 |
| 3,068,045 | 12/1962 | Komeda | 296/202 |
| 4,866,883 | 9/1989 | Brown et al. | 296/202 |

FOREIGN PATENT DOCUMENTS

| 2809721 | 9/1979 | Fed. Rep. of Germany | 296/146 |
| 128032 | 7/1984 | Japan | 296/146 |
| 2133448 | 7/1984 | United Kingdom | 296/146 |

Primary Examiner—Robert R. Song
Attorney, Agent, or Firm—Karl Hormann

[57] ABSTRACT

A cover for providing a closure for a substantially triangular opening formed between a marginal section of a door frame of the body of an automobile and a substantially vertical forward upper edge portion of a window movably mounted in the door.

6 Claims, 4 Drawing Sheets

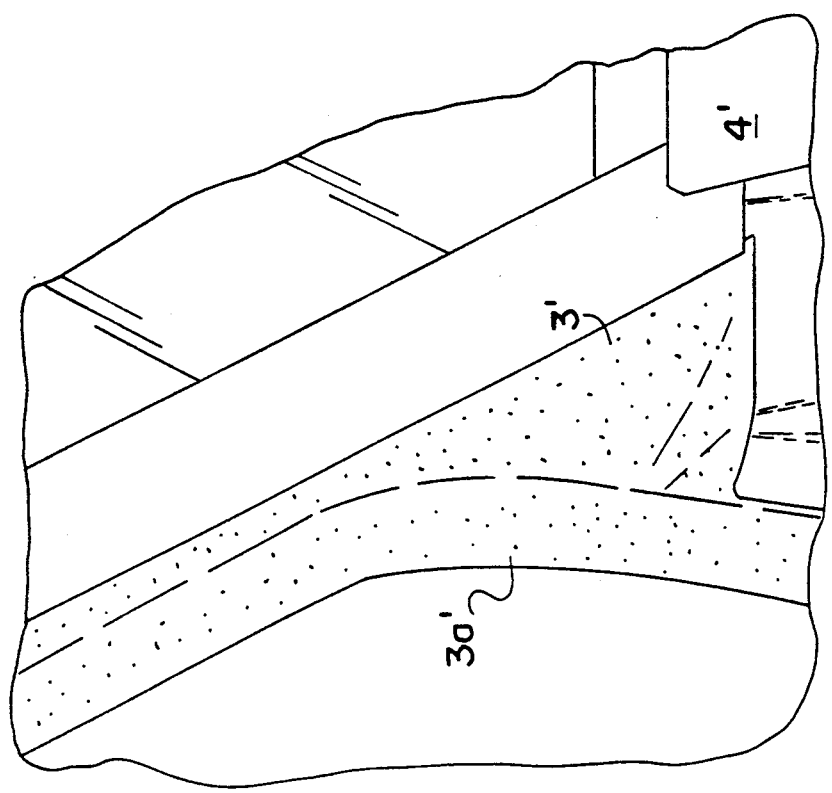
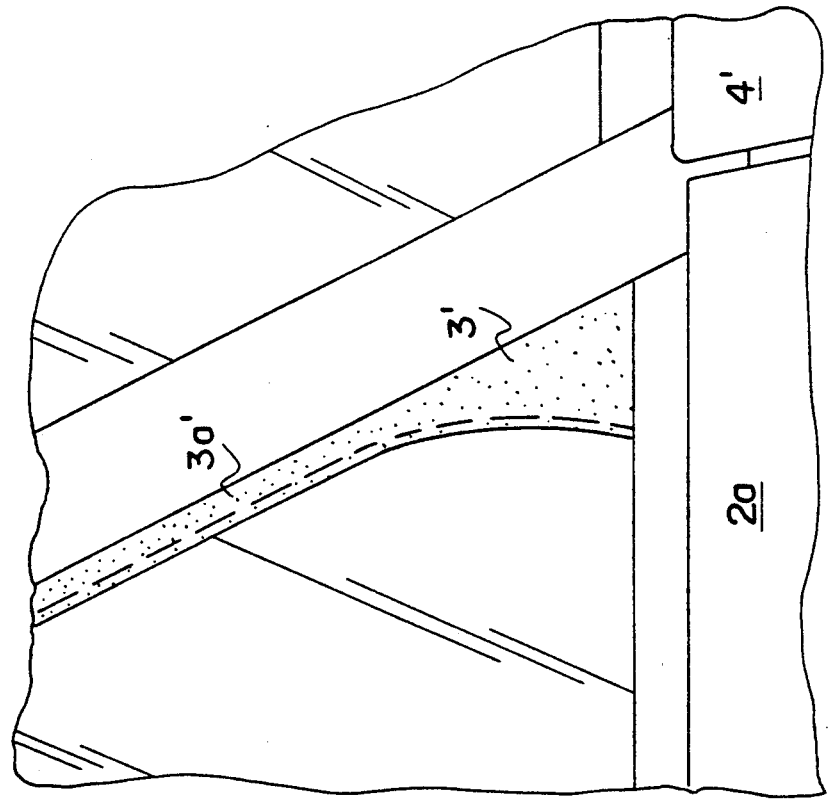

DOOR COVER AND SEAL FOR A DOOR

DESCRIPTION

The invention relates to a cover and gasket or seal for use in connection with movable windows of the type provided in doors, in particular windows of the kind mounted in doors as provided in bodies of automotive vehicles, especially passenger cars, whereby a cover is provided for a corner section of the window or the door frame, as the case may be.

EP-A (European patent application) 1 200 582 discloses a gasket or seal for closable windows of automobiles which for the purpose of being mounted to the body provides for a special corner piece with a gasket attached thereto. The gasket is placed in a position corresponding to a terminal position of the window. Expansions or compressions of the gasket are said to be compensated for by a controllable (heatable or coolable) fluid. Such a structure would require a relatively great effort to ensure the effectiveness of the seal.

German published patent specification 33 23 459 discloses a cover for a corner section of a window and comprising a lining or molding and an outer element. The molding and the outer element are provided with a mechanism which limits movement of the outer element from its mounted position in a direction opposite the movement of the outer element when it is being connected to the molding. This structure, too, is elaborate and is structured to be affixed between a frame and a window by means of locking elements.

It is a task of the invention to provide a simple and easily mountable member for covering void spaces between movable and fixed parts of windows, such as windows in doors of automotive vehicles.

This task is accomplished by the means identified in the characterizing portion of patent claim 1.

Mounting the cover on the chassis advantageously facilitates the assembly. This is of particular significance in connection with assembly line production. The parts may easily be manufactured, and they may be provided in limitless designs. They may easily be shaped to conform to corner sections of existing or desirable doors, frames or supports. They are also suitable for systems requiring no window frame.

They may advantageously replace moldings or stylistic covers, and by way of added advantage they seal movable parts relative to the body. To provide a seal one less gasket and one less support are needed in this manner. The cover and the gasket may either be mounted together on the body or, in a particularly advantageous embodiment, they are formed integrally, for instance by vulcanization.

Those structural components of the body to which the gasket is to be affixed advantageously are formed as extrusion molded light metal parts. The novel cover may advantageously be used on any door or window, especially on those of four-door passenger vehicles.

Embodiments of the invention are depicted in the accompanying drawing and are explained in the following description.

Figure 1:
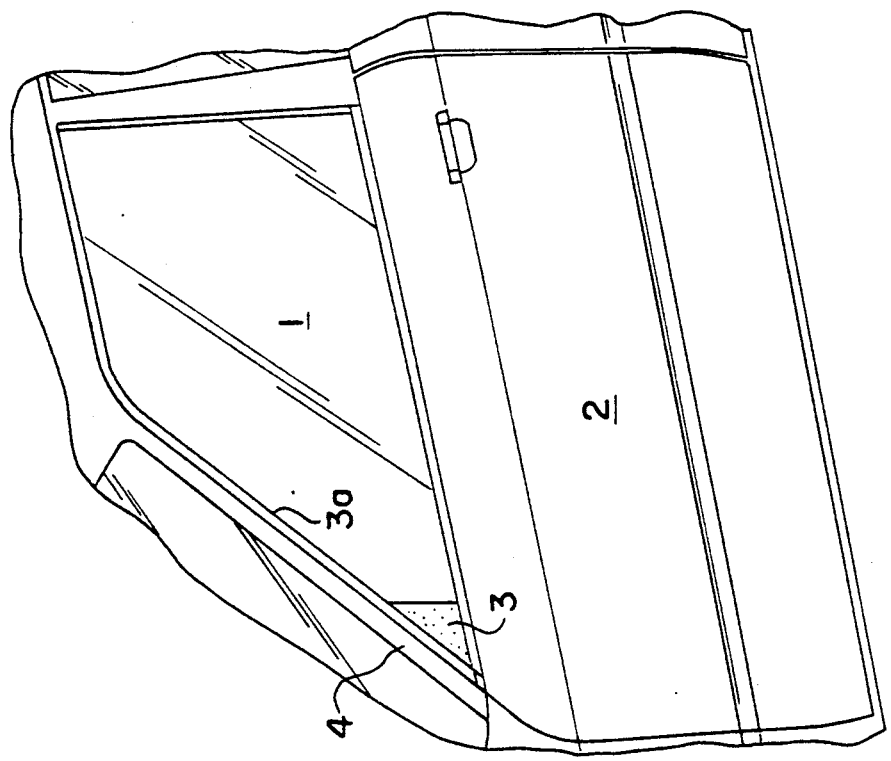
Figure 6:
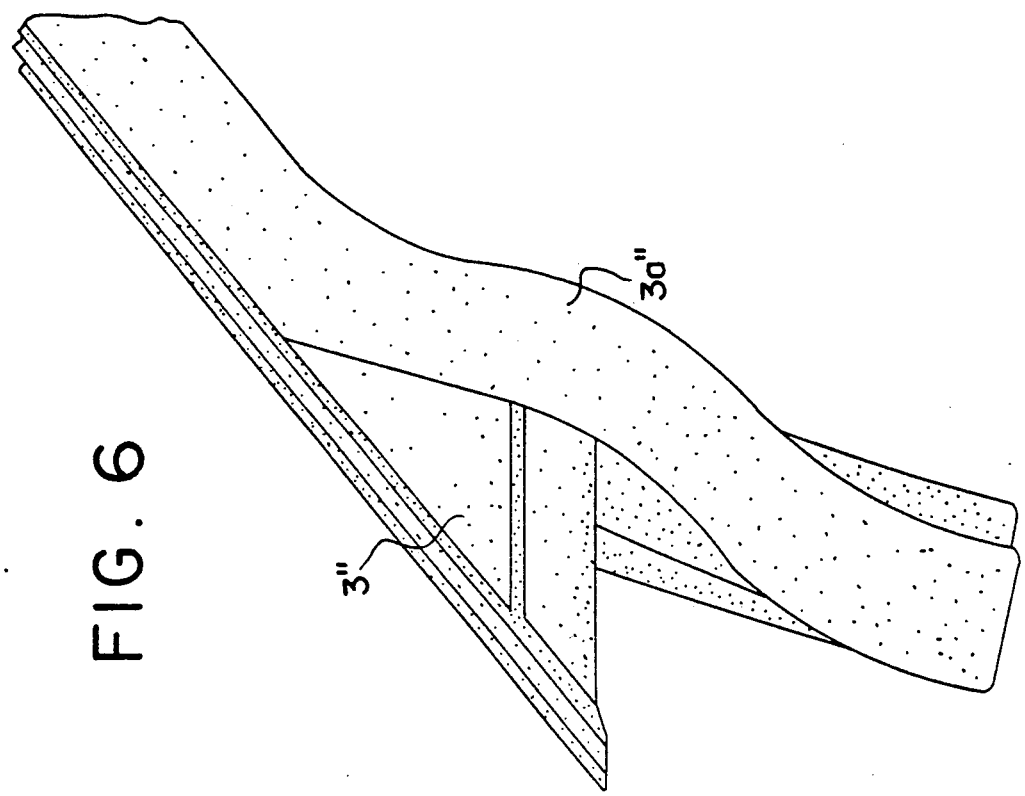
Figure 5:
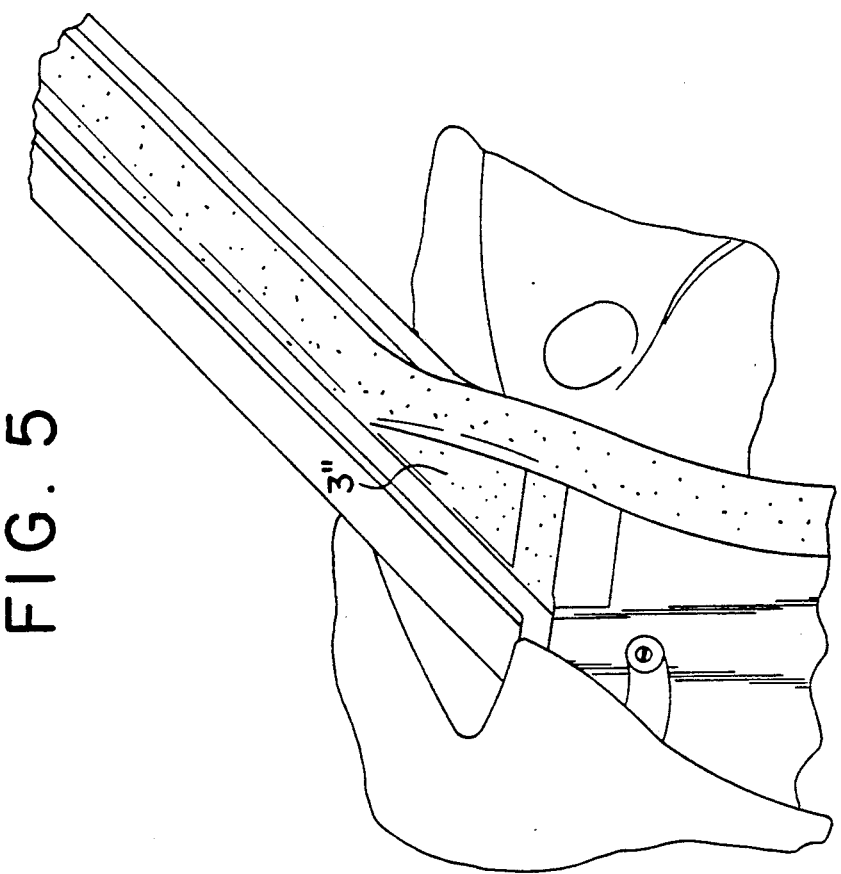
Figure 7:
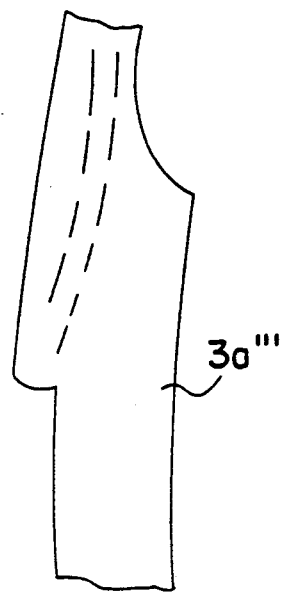
Figure 8:
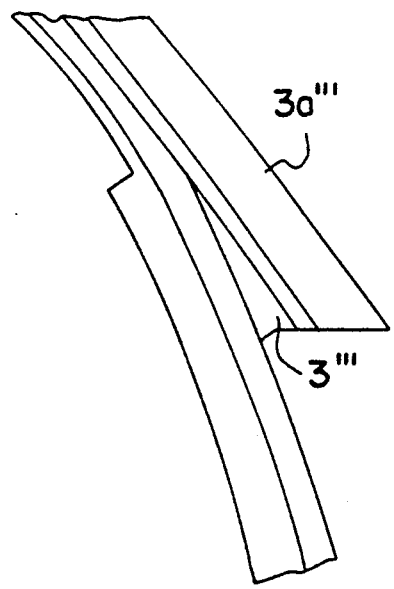

FIG. 1 depicts a front door in closed position;
FIG. 2 depicts the same door in opened position;
FIG. 3 depicts a rear door in closed position;
FIG. 4 depicts the same door as in FIG. 3 in an opened positioned;
FIG. 5 depicts an alternative embodiment of the invention in its mounted condition;
FIG. 6 depicts the same embodiment as FIG. 5 in detail;
FIG. 7 is a planar view of a further embodiment;
FIG. 8 depicts the embodiment of FIG. 7 in elevation.

FIG. 1 shown an embodiment of the invention as utilized in connection with a front door 2 of a passenger car having an approximately triangularly shaped cover member 3 in a frame provided for a window 1. A gasket member 3a shown in the drawing to be obliquely abutting the cover member 3 is attached to the frame of the body 4, which may be provided with a correspondingly shaped molding extruded from light metal. Thus, the intermediate space between the window 1 and the body 4 or the molding is thus closed.

In this embodiment the cover member 3 and the gasket or seal 3a mounted together as a unit but manufactured as separate components provides a seal between the window 1 and the body 4 when the door 2 is in its closed condition.

As is shown in FIG. 2 for instance, guidance of the window 1 is unimpaired by this structure; it may advantageously be a parallel guidance system (see the rendition in FIG. 2 of an open window 1 in the door 2). The door 2 is one without a frame and is fully sealed by the cover member 3 and the gasket 3a of the invention.

FIG. 3 shows a rear door 2a in a closed position, and FIG. 4 depicts the door 2' in its opened position, the cover member 3' and the gasket 3a' being formed integrally.

FIGS. 5 and 6 depict another embodiment of the invention and are intended to show pieces of a hard polymeric material and of a softer elastomeric material as integral units formed together (for instance by vulcanization) in a common mold. In this case the gasket 3a" may extend over the entire surface of the corner cover member 3".

As described supra, in the embodiments according to FIGS. 7 and 8 the cover and the gasket 3a" are also formed integrally. To function both as a cover member and as a gasket the element is made of an elastomeric polymer of rubber.

Deviations of the embodiments may be carried out without departing from the scope of the invention.

We claim:

1. A cover for providing a closure for a substantially triangularly shaped opening provided between a marginal section of a door frame of the body of an automotive vehicle, a section of a substantially plane margin of a door mounted in said frame and a marginal section of a window extending in a generally upright direction from said plane margin tangent to said section thereof, comprising:
   first elongate means for mounting said cover to said marginal section of said door frame;
   second elongate means extending below said plane marginal section of said door frame;
   third elongate means extending generally parallel to and beyond said marginal section of said window; and
   cover means connected to and substially surrounded by said first, second and third elongate means.

2. The cover of claim 1, wherein end portions of said second and third elongate members are connected to said first elongate member.

3. The cover of claim 2, wherein said first, second and third elongate means comprise elastically deformable gasket means.

4. The cover of claim 3, wherein said cover means is substantially rigid.

5. The cover of claim 4, wherein said cover means and said elongate members are joined by vulcanization.

6. The cover of claim 5, wherein said first elongate means comprises extensions for forming a door gasket.

* * * * *